US006719107B1

(12) United States Patent
Chen

(10) Patent No.: US 6,719,107 B1
(45) Date of Patent: Apr. 13, 2004

(54) BRAKING ASSEMBLY WITH SELF-GENERATING POWER ENERGY

(75) Inventor: Shui Jung Chen, Taipei (TW)

(73) Assignee: Direction Technology Co., Ltd., Taipei (TW)

( * ) Notice: Subject to any disclaimer, the term of this patent is extended or adjusted under 35 U.S.C. 154(b) by 0 days.

(21) Appl. No.: 10/373,060

(22) Filed: Feb. 26, 2003

(51) Int. Cl.$^7$ ................................................. B60L 7/00
(52) U.S. Cl. ...................................................... 188/164
(58) Field of Search ................................. 188/158, 159, 188/162, 164, 325, 2 D; 192/84.6, 20

(56) References Cited

U.S. PATENT DOCUMENTS

| | | | | |
|---|---|---|---|---|
| 5,711,404 A | * | 1/1998 | Lee | 188/164 |
| 5,986,370 A | * | 11/1999 | Cheng | 310/77 |
| 6,084,325 A | * | 7/2000 | Hsu | 310/74 |
| 6,585,087 B2 | * | 7/2003 | Lin | 188/164 |

* cited by examiner

Primary Examiner—Jack Lavinder
Assistant Examiner—Xuan Lan Nguyen
(74) Attorney, Agent, or Firm—Rosenberg, Klein & Lee

(57) ABSTRACT

A braking assembly with self-generating power energy is provided with a plurality of permanent magnets arranged around a rotary central shaft of the braking assembly to alternate N poles and S poles, at least one power-generating coil provided on a stator of the braking assembly nearby the permanent magnets for generating an induced electromotive force when the rotary central shaft rotates, a pulling mechanism provided on the stator for pulling two free ends of two curved braking plates mounted on the stator depending on the induced electromotive force generated by the power-generating coil and thereby regulating a brake force of the braking assembly, and at least one compression spring provided between each of the curved braking plates and the stator to provide a radially outward restoring force to the curved braking plates.

3 Claims, 3 Drawing Sheets

BRAKING ASSEMBLY WITH SELF-GENERATING POWER ENERGY

BACKGROUND OF THE INVENTION

1. Field of the Invention

The present invention relates to a braking force regulating structure for a braking device, and more particularly to a braking assembly with self-generating power energy.

2. Description of the Prior Art

A conventional braking assembly, such as the brake for an exercise bike, mainly includes a rotor 1 and a stator 2, as shown in FIG. 3. Two corresponding curved braking plates 3 are pivotally connected to the stator 2, and a plurality of curved permanent magnets 4 are provided at an outer circumferential surface of the curved braking plates 3, such that outer circumferentially surfaces of the curved permanent magnets 4 face toward an inner circumferential surface of the rotor 1 with a proper air clearance left between them. When the rotor 1 rotates, an eddy current is produced as a result of an induction between the permanent magnets 4 and the rotor 1 and consequently, a dragging force will be applied the rotor 1. The smaller the air clearance between the permanent magnets 4 and the rotor 1 is, the stronger the induced eddy current is, and the larger the produced dragging/braking force is. Accordingly, this dragging force can be used as the resistance of sporting equipment.

To regulate the braking force, the conventional braking assembly of FIG. 3 includes a cable 5 that can be manually operated to pull one of two ends of each curved braking plate 3 and thereby adjust a distance of the air clearance between the outer circumferential surfaces of the permanent magnets 4 and the inner circumferential surface of the rotor 1 and accordingly, the braking force of the braking assembly.

Other similar types of conventional braking structures are also found in prior patents. U.S. Pat. No. 6,360,855 discloses a brake for an exercise bike. The brake includes a first and a second disc-shaped plate, a center shaft extended between the two disc-shaped plates, and a plurality of bars and rollers located between the two disc-shaped plates to space the latter from each other by a predetermined distance. The brake also internally includes two curved plates having magnets provided on outer circumferential surfaces thereof. The two curved plates are pivotally connected at an end to and between the two disc-shaped plates, and connected at the other end to a pulling cord. When the pulling cord is pulled, a braking effect of the brake may be changed.

In U.S. Pat. No. 5,711,404, a magnetic adjustable loading device with eddy current is disclosed. In the prior art, the stator is configured by a pair of opposite circular magnetic plates made from magnetic material. The outer rim portion of circular magnetic plate is provided with a permanent magnet, and the inner rim portion of the circular plate is disposed with a biasing spring. The braking force of the magnetic adjustable loading device is adjusted by pulling the free end of the circular plate.

Moreover, U.S. Pat. No. 6,345,703 discloses a magnetic adjustable loading wheel for an exercise apparatus. A stator disk is disposed at the inner side rim of the flywheel and a pair of resilient pieces are mounted on the stator disk. The resilient pieces have a guide post and two pushing posts, and a permanent magnet is fitted on the resilient piece. By means of a pull rope, the clearance between the permanent magnet and a metal conductor at the inner rim of a flywheel is therefore adjustable to change the braking force.

In U.S. Pat. No. 6,273,845, a load applying device for exercisers is disclosed, which includes a plate secured on a spindle, and a rotating disc rotatably secured on the spindle and having a peripheral fence engaged on the plate. One or more arms each supports one or more magnets and each has one end rotatably secured to the plate for moving the magnets toward and away from the peripheral fence of the rotating disc and for adjusting the brake torque of the magnets applied onto the rotating disc. One or more springs may bias the arms and the magnets toward the peripheral fence of the rotating disc.

Furthermore, a wheel-type resistance device for a bicycle exerciser is disclosed in U.S. Pat. No. 5,851,165, which includes a flywheel rotated with a hub member around an axle, and has an accommodation chamber with a first circumferential portion extending in a radial direction and provided with a plurality of magnetically attractive members. A dragging force adjusting member is mounted on the axle and has a second circumferential portion registered with the first circumferential portion. A cam member is mounted rotatably on the axle. A pair of cam followers are disposed respectively on the upper and lower magnetic members and are moved by the cam member such that counterclockwise rotation of the cam member will impart linear movements of the upper and lower magnetic members towards the horizontal line. As such, the overlapping area of the upper and lower magnetic members with the second circumferential portion can be decreased so that the magnetic dragging force can be correspondingly decreased to accommodate a variety of exercising requirements.

A disadvantage of the above-mentioned conventional brakes is that it must be manually operated to regulate the braking force thereof. To change the manually operated brake to a power-controlled brake, it is necessary to connect with an external power source so as to supply power to a driving mechanism of the brake. This requirement restricts the mounting of the brake to a position close to a power supply, otherwise wiring to power source is needed.

Therefore, it is desired to release the conventional brake from the limitations of being mounted close to the external power source, so that the brake may be conveniently used at any place.

To meet the above requirement, there is developed a self-excitation type power-generating braking structure. U.S. Pat. No. 6,084,325 discloses a Brake device with a combination of power-generating and eddy-current magnetic resistance, in which a power-generating coil is provided to one side of a flywheel. When the flywheel rotates, the power-generating coil is caused to generate electrical energy to produce a braking force. However, the power-generating coil must work with the large flywheel to produce the required electrical energy and could not be integrated into the braking device. This results in a complicate structure of the braking device and troublesome assembling and mounting thereof.

It is therefore tried by the inventor to develop a braking assembly with self-generating power energy to eliminate the drawbacks existed in the conventional brakes.

SUMMARY OF THE INVENTION

A primary object of the present invention is to provide a braking assembly with self-generating power energy. The braking assembly has power-generating function to provide electric power energy needed by an internal pulling mechanism and an external control panel thereof, so that the braking assembly can be conveniently mounted for use without the need of connecting to an external power supply.

To achieve the above objects, in accordance with the present invention, there is provided a braking assembly with self-generating power energy. The braking assembly with self-generating power energy is provided with a plurality of permanent magnets arranged around a rotary central shaft of the braking assembly to alternate N poles and S poles and at least one power-generating coil on a stator of the braking assembly nearby the permanent magnets for generating an induced electromotive force when the rotary central shaft rotates. A pulling mechanism is provided on the stator for pulling two free ends of two curved braking plates mounted on the stator depending on the induced electromotive force generated by the power-generating coil and thereby regulating a brake force of the braking assembly, and at least one compression spring provided between each of the curved braking plates and the stator to provide a radially outward restoring force to the curved braking plates.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
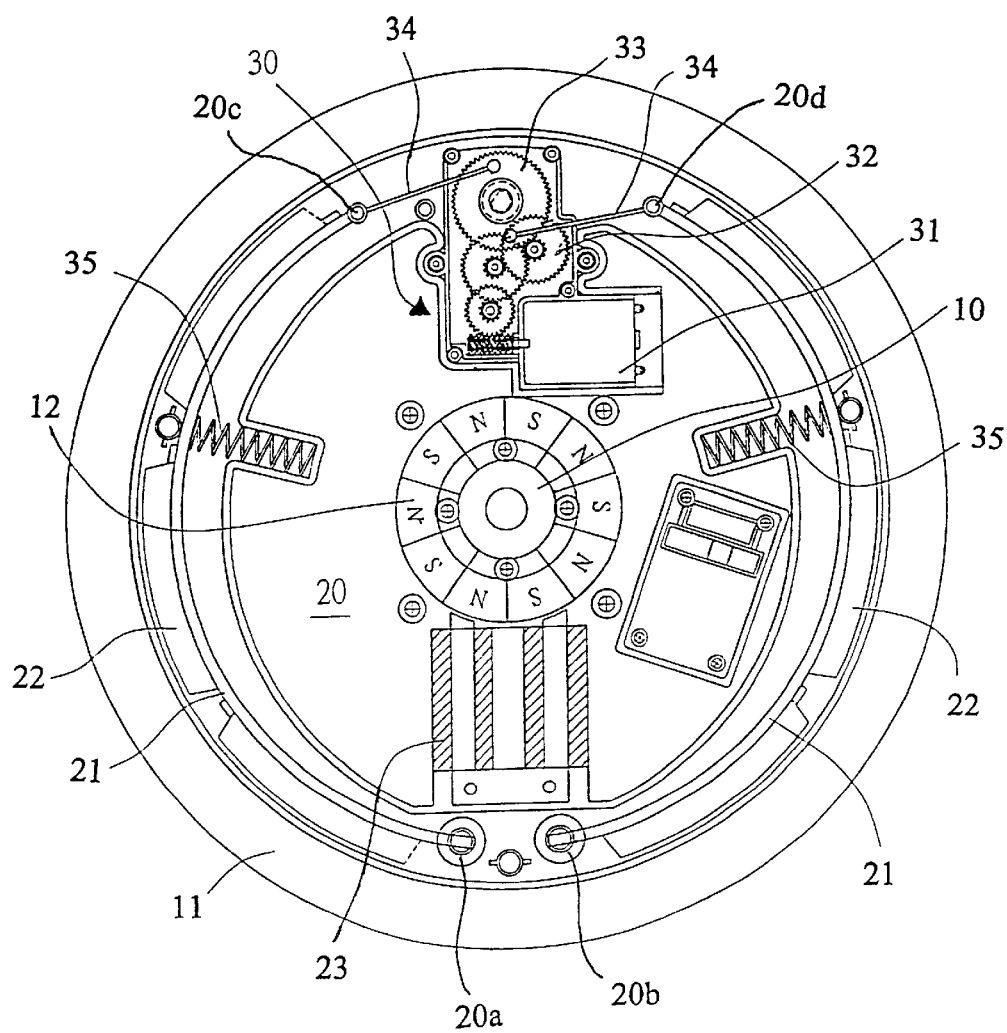
FIG. 1 is a plan view of a braking assembly with self-generating power energy according to a preferred embodiment of the present invention.

Please refer to FIG. 1 that is a plan view of a braking assembly according to a preferred embodiment of the present invention. As shown, the braking assembly of the present invention mainly includes a rotary central shaft 10, a rotor 11 rotating along with the rotary central shaft 10, a stator 20, and two curved braking plates 21. The rotor 11 may be made of cast iron, forge iron, or cast steel. Two adjacent ends of the two curved braking plates 21 are pivotally connected via pivoting means, such as pivot shafts 20a and 20b, to predetermined positions on an outer circumferential surface of the stator 20, and the other two adjacent ends of the two curved braking plates 21 are left suspended, so that outer circumferential surfaces of the curved braking plates 21 face toward an inner circumferential surface of the rotor 11. By regulating an air clearance between the outer circumferential surfaces of the curved braking plates 21 and the inner circumferential surface of the rotor 11, a magnitude of a braking force of the braking assembly may be controlled.

Figure 2:
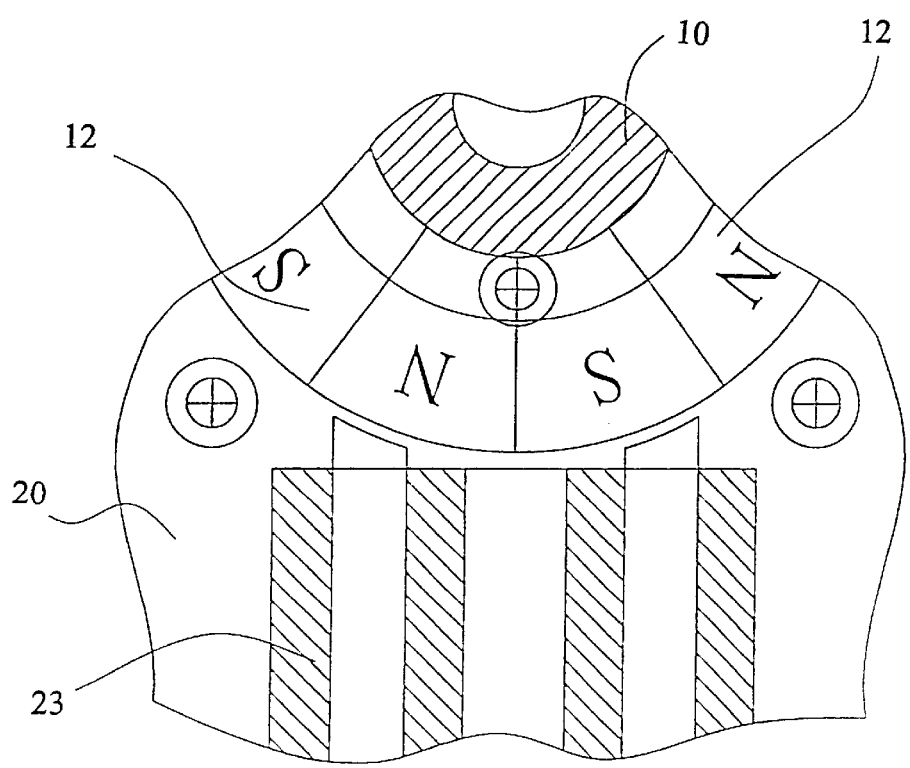
FIG. 2 is a partly enlarged view of FIG. 1 showing arrangements of a rotary central shaft, permanent magnets, and a power-generating coil included in the braking assembly of the present invention.
Figure 3:
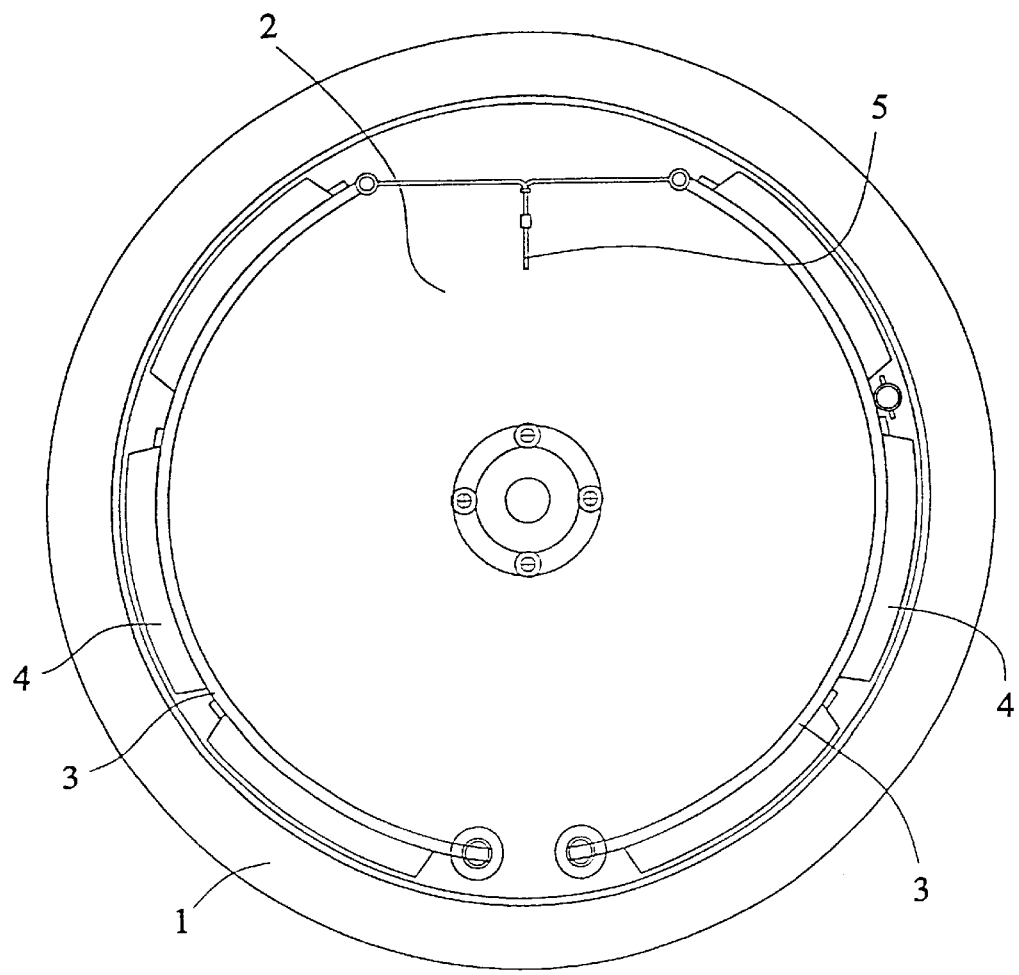
FIG. 3 is a plan view of a conventional braking assembly.

The curved braking plates 21 are fixedly provided on respective outer circumferential surfaces with a plurality of permanent magnets 22. The permanent magnets 22 have curved outer surfaces facing toward the circumferential inner surface of the rotor 11. In the present invention, there are permanent magnets 12 continuously arranged around an outer surface of the rotary central shaft 10, so that the north poles and the south poles alternate around the rotary central shaft 10. FIG. 2 is a partly enlarged view of FIG. 1 showing the arrangement of these permanent magnets 12. There is at least one power-generating coil 23 provided on the stator 20 at a position close to the permanent magnets 12.

In addition, the stator 20 also has a pulling mechanism 30 provided thereon for regulating the air clearance between the curved braking plates 21 and the rotor 11. The pulling mechanism 30 includes a motor 31, a transmission shaft thereof outward extends to mesh with and thereby drives a conventional reduction gear set 32 which includes a toothed disc 33. Two pulling cords 34 are fixedly connected at respective one end to two diametrically opposite points on the same side surface of the toothed disc 33, and at respective another end to free ends 20c, 20d of the two curved braking plates 21. The pulling cords 34 may be, for example, two linking bars or two ropes for connecting two free ends 20c, 20d of the curved braking plates 21 and the pulling mechanism 30.

As can be seen from FIG. 1, each of the two curved braking plates 21 is provided at a predetermined position on an inner circumferential surface with a compression spring 35 to radially extend between the curved braking plate 21 and the stator 20, so that the compression spring 35 provides a radially outward restoring force to the curved braking plate 21.

With the above arrangements, when the rotary central shaft 10 rotates, it brings the rotor 11 to rotate synchronously. At this point, excitation eddy currents are generated between the rotor 11 and the permanent magnets 22 mounted on the curved braking plates 21 fixed to the stator 20 to brake the rotor 11.

And, while the rotary central shaft 10 rotates, an alternating electromotive force is produced by the power-generating coil 23 due to a magnetic induction between the power-generating coil 23 and the permanent magnets 12 provided on the outer surface of the rotary central shaft 10. The produced alternating electromotive force may be rectified and stabilized by conventional rectifier and stabilizer to provide a DC voltage that is sent from an output of the stabilizer to the motor 31 of the pulling mechanism 30 for use as a working power supply.

When the motor 31 rotates clockwise, the reduction gear set 32 meshing with the transmission shaft of the motor 31 drives the toothed disc 33 to rotate clockwise and pull the two pulling cords 34. At this point, the two curved braking plates 21 are pulled by the pulling cords 34 toward the stator 20, and the air clearance between outer surfaces of the permanent magnets 22 on the curved braking plates 21 and the inner circumferential surface of the rotor 11 is increased to reduce the brake force of the braking assembly.

And, when the motor 31 rotates counterclockwise, the pulling of the curved braking plates 21 by the pulling cords 34 is released, and the restoring force of the compression springs 35 pushes the curved braking plates 21 radially outward to reduce the air clearance between outer surfaces of the permanent magnets 22 on the curved braking plates 21 and the inner circumferential surface of the rotor 11, and the brake force of the braking assembly is increased. That is, the brake force of the braking assembly of the present invention may be electrically automatically regulated.

While the present invention has been described with reference to the specific embodiments, the description is illustrative of the invention and is not to be construed as limiting the invention. Therefore, various modifications to the present invention can be made to the preferred embodiments by those skilled in the art without departing from the true spirit and scope of the invention as defined by the appended claims.

What is claimed is:

1. A braking assembly for an exercise apparatus, comprising:
- a stator having an outer circumferential surface and a central shaft hole for a rotary central shaft to extend therethrough;
- a rotor, located around the outer circumferential surface of said stator to rotate along with said rotary central shaft when the rotary central shaft rotates;
- a pair of curved braking plates, each having an outer circumferential surface;
- a plurality of first permanent magnets fixed to the outer circumferential surface of each said curved braking plate;
- two adjacent ends of said two curved braking plates being pivotally connected via pivoting means to predetermined positions on the circumferential surface of said stator, and the other two adjacent ends of said two curved braking plates being free ends;
- a plurality of second permanent magnets, each of which having a north pole and a south pole, arranged around an outer surface of said rotary central shaft, so that the north poles and the south poles of the second permanent alternate around said rotary central shaft;
- at least one power-generating coil being provided on said stator at a position close to said second permanent magnets around said rotary central shaft, whereby when said rotary central shaft rotates and brings said second permanent magnets mounted therearound to rotate at the same time, an induced electromotive force is generated through induction of said power-generating coil; and
- a pulling mechanism provided on said stator to pull said curved braking plates at said free ends via two pulling cords, and a pulling force applied by said pulling mechanism to said free ends of said curved braking plates is dependent on said induced electromotive force generated by said power-generating coil and able to change an air clearance between said first permanent magnets on said curved braking plates and an inner circumferential surface of said rotor to thereby regulate a brake force of said braking assembly.

2. The braking assembly as claimed in claim 1, wherein said pulling mechanism comprises a motor, a reduction gear set driven by said motor, a toothed disc and said two pulling cords extended from two diametrically opposite points at the same side surface of said toothed disc to separately connect to said free ends of said two curved braking plates; whereby when said toothed disc is rotated clockwise and counterclockwise, said curved braking plate are pulled and released, respectively, via said pulling cords connected to said free ends of said curved braking plates.

3. The braking assembly as claimed in claim 1, wherein a compression spring is provided between an inner circumferential surface of each said curved braking plate and the outer circumferential surface of said stator to provide a radially outward restoring force to each said curved braking plate.

* * * * *